United States Patent [19]

Clark et al.

[11] Patent Number: 5,398,297

[45] Date of Patent: Mar. 14, 1995

[54] IMPROVED COLOR RENDERING METHOD FOR INTENSITY-VARIABLE PRINTING BASED UPON A DITHERING TABLE

[75] Inventors: Jeffery J. Clark, Tigard; Brian G. Crosby, Tualatin; Bo Lewendal, Beaverton; Christopher D. Shaver; Gregory P. Thornton, both of Tigard; Patrick E. Welborn, Lake Oswego, all of Oreg.

[73] Assignee: Tektronix, Inc., Wilsonville, Oreg.

[21] Appl. No.: 919,871

[22] Filed: Jul. 27, 1992

[51] Int. Cl.⁶ .................. H04N 1/23; H04N 1/46; G06F 15/00; G01D 15/10
[52] U.S. Cl. .................. 358/298; 358/457; 358/530; 395/128; 347/172
[58] Field of Search .............. 358/298, 296, 503, 530, 358/531, 532, 533, 534, 457, 461; 395/108, 128, 133; 346/76 PH; 382/50, 54, 55

[56] References Cited

U.S. PATENT DOCUMENTS

| | | | |
|---|---|---|---|
| 4,823,189 | 4/1989 | Haines et al. | 358/298 X |
| 4,831,462 | 5/1989 | Abuyama et al. | 358/298 |
| 4,890,121 | 12/1989 | Hirahara et al. | 346/76 PH |
| 4,908,876 | 3/1990 | DeForest et al. | 382/54 |
| 4,924,301 | 5/1990 | Surbrook | 358/75 |
| 4,969,052 | 11/1990 | Ishida et al. | 358/457 |
| 4,983,994 | 1/1991 | Mori et al. | 346/76 PH |
| 5,031,050 | 7/1991 | Chan | 358/298 |
| 5,077,615 | 12/1991 | Tsuji | 358/298 |
| 5,140,432 | 8/1992 | Chan | 358/298 |
| 5,204,753 | 4/1993 | Tai | 358/298 |
| 5,208,871 | 5/1993 | Eschbach | 358/457 X |
| 5,241,324 | 8/1993 | Tamura et al. | 358/298 X |
| 5,241,328 | 8/1993 | Sarraf et al. | 358/298 X |
| 5,258,854 | 11/1993 | Eschbach | 382/55 X |

*Primary Examiner*—Benjamin R. Fuller
*Assistant Examiner*—Eric Frahm
*Attorney, Agent, or Firm*—Ralph D'Alessandro; John D. Winkelman

[57] ABSTRACT

A system and method of printing an image on a substrate based on an input of detailed image intensity information for each of discrete pixel areas of the substrate, includes or performs steps of processing the detailed image intensity information into less detailed image intensity information; dithering the less detailed image intensity information to approximate the intensity resolution of the detailed image intensity information; and printing the dithered, less detailed, image intensity information onto the substrate. The system will use less memory space than a comparable system which prints directly from the detailed image intensity information, will minimize patterning effects, and will correct for artifacts which might otherwise be printed.

40 Claims, 3 Drawing Sheets

IMPROVED COLOR RENDERING METHOD FOR INTENSITY-VARIABLE PRINTING BASED UPON A DITHERING TABLE

BACKGROUND OF THE INVENTION

1. Field of the Invention

This invention relates to printing methods and systems of the type in which discrete areas or pixels are varied in intensity to create an image on a substrate. More specifically, the invention relates to a system or method for intensity-variable printing which provides smoother image quality with less memory use than systems heretofore known.

2. Description of the Prior Art

Intensity-variable printing is, for the purposes of this document, defined as any type of printing in which colorant may be deposited on a base unit area, or pixel, in more than one intensity or degree of dilution. Diffusion printing, which is defined as including both common dye-diffusion and sublimation dye printing techniques, is one type of intensity-variable printing. Other intensity-variable printing techniques may include continuous ink jet printing, variable spot-sized phase change ink jet printing, variable dot electrophotography, variable dot thermal transfer printing, laser-induced dye diffusion transfer processes, dry silver technology and photographic printing, as well as others.

Dye diffusion printing involves the transfer of a dye colorant from a carrier, such as a polymer ribbon, onto a specialized substrate surface, such as a polyester sheet or a coated sheet of ordinary paper, in a controlled manner to generate an image. A thermal transfer print engine having an array of electrically actuatable heating elements is typically positioned so that the ribbon is juxtaposed between the print head elements and the substrate. The amount or intensity of dye deposited at a single location or pixel on the substrate can be varied by adjusting the electrical input to the print head elements. When one or more of the print head elements is heated, the dye/carrier structure is heated to a temperature sufficient to cause migration of a commensurate amount of dye to the substrate. By using a ribbon or ribbons having the three primary or subtractive colors, or those colors plus black, highly subtle colorant gradations may be achieved on the substrate. Images of near photo quality have been produced using dye diffusion technology.

One disadvantage that is present in some such systems is the tendency to produce unwanted patterning and printer-created artifacts. For example, patterning might result if more than one of the possible inputted intensity-specifying values is assigned to a single power input level for the heating elements of the print head, as would be the case if a large range of intensity-specifying values were to be compressed over a smaller range of selected power input levels.

In designing such systems, it is also desirable to keep printer memory requirements to a minimum. Memory adds to the cost of the printer, and printer speed and performance will tend to decrease as the degree of memory storage and manipulation escalates.

It is clear there has existed a long and unfilled need in the prior art for an intensity-variable printing system and method which abates patterning and printer-created artifacts, which provides smoother shading of colors, and which uses less memory space than systems and methods heretofore known.

SUMMARY OF THE INVENTION

Accordingly, it is an object of the invention to provide an intensity-variable printing system and method which will tend to ameliorate patterning and printer-created artifacts.

It is further an object of the invention to provide an intensity-variable printing system and method, which provides a smoother shading of colors than systems presently in use.

It is yet further an object of the invention to provide an intensity-variable printing system and method which uses less memory space than systems and methods of this type heretofore known.

To achieve the above and other objects of the invention, a method according to a first aspect of the invention for printing an image on a substrate based on detailed image intensity information for each of discrete pixel areas of the substrate, includes the steps of processing the detailed image intensity information into less detailed image intensity information; dithering the less detailed image intensity information to approximate the intensity resolution of the detailed image intensity information; and printing the dithered less detailed image intensity information on to the substrate.

According to a second aspect of the invention, a method of printing on a one-pixel area of a substrate based on detailed intensity information for the one-pixel area, includes processing the detailed image intensity information into a first approximated intensity value and a differential value which represents the difference between the first approximated value and the detailed image intensity information; comparing the differential value with a predetermined value which has been set for the one-pixel area; determining whether to use the first approximated value or a second approximated value on the basis of such comparison; and printing on the one-pixel area at the determined intensity.

A method of printing an image on a substrate based on detailed image intensity information for each of discrete pixel areas of the substrate includes, according to a third aspect of the invention, steps of processing the detailed image intensity information into a first less detailed image intensity value; determining whether to use the first less detailed image intensity value or a second image intensity value based on the difference between the detailed image intensity information and the first value; and printing on the substrate in accordance with the determined value.

A method of printing an image on a substrate according to a fourth aspect of the invention includes the steps of processing the detailed image intensity information into a first less detailed image intensity value; determining whether to use the first less detailed image intensity value or a second image intensity value which has the same level of detail as the first value; transforming the determined value into printer acceptable format; and printing the transformed information onto the substrate.

The invention also embraces printing systems and printed products which correspond to the inventive methods.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
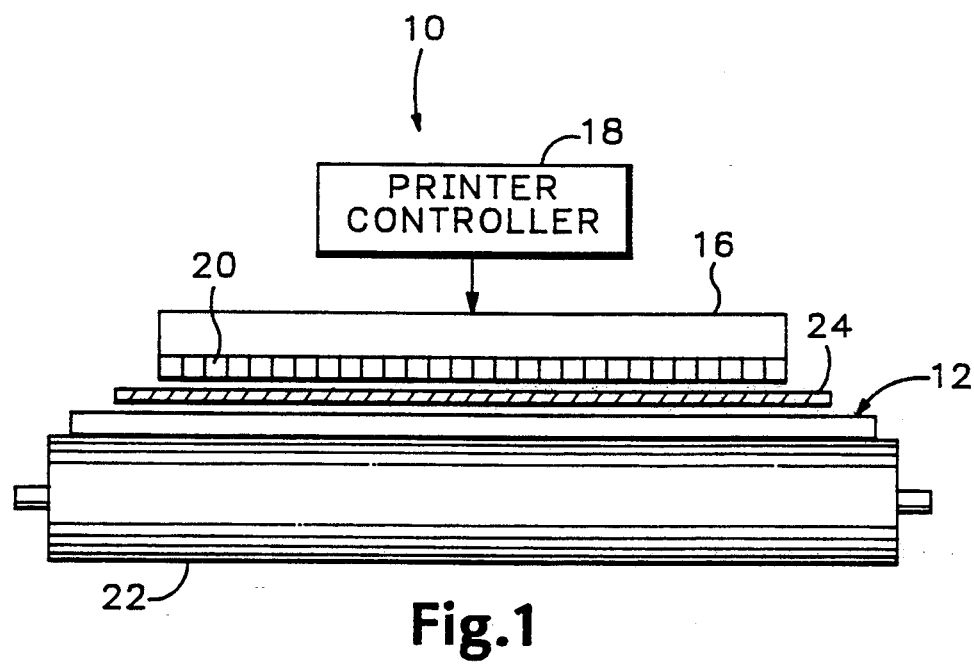
FIG. 1 is a schematic diagram depicting an intensity variable printing system constructed according to a preferred embodiment of the invention.

Referring now to the drawings, wherein like reference numerals designate corresponding structure throughout the views, and referring in particular to FIG. 1, an intensity-variable printing system 10 according to a preferred embodiment of the invention is preferably a diffusion-type printing system. System 10, designed to print an image on a substrate 12, includes a printhead element 16, which is responsive to commands from a printer controller 18. Printhead 16, according to the preferred embodiment of the invention, includes a linear array of heating elements 20, each of which may be heated in response to a command from the printer controller 18 by electrical resistance. Each heating element is intended to be aligned with discrete unit areas or pixels on the substrate 12.

A printer ribbon 24 is interposed between heating elements 20 and the substrate 12. Printer ribbon 24 includes a carrier layer, and a colorant layer containing a dye or colorant that is designed to migrate to the substrate upon application of heat from one or more of the heating elements 20. For dye-diffusion printing, the ribbon 24 contacts the substrate 12, and the colorant migrates into the substrate on a molecular level. For sublimation dye printing, there is no contact between the ribbon and the paper, and heat from the heating elements causes the colorant to sublimate, or phase from solid to gas, adjacent to the substrate, causing absorption in to the substrate 12. The surface of substrate 12 must be chemically compatible with the dye of colorant for printing to be successful, as is well known to those having ordinary skill in this technology.

System 10 is preferably a color printing system, and ribbon 24 preferably includes different portions, each having colorant impregnated thereon, which correspond to the three primary or subtractive colors. Optionally, a black portion may also be included. More than one ribbon 24 may also be used to accomplish transfer of the different colorants to the substrate, if desired.

A support roller 22 or equivalent surface is provided to support substrate 12 in parallel spaced relationship with respect to heating elements 20. By selectively controlling the heating elements 20 on printhead 16, printer controller 18 is constructed to control the placement of an image onto the substrate 12, as will be described in greater detail below.

Preferably, printhead 16 is obtainable from Sharp Electronics Corporation as Model No. JX561. Preferably, ribbon 24 is the printer ribbon which is obtainable from Sharp Electronics under Model No. A4JX61R3T, which is a three color ribbon having a cyan component, a magenta component, and a yellow component. Alternative ribbon models may include Sharp Electronics Model No. A4JX61R4T, which is a four color ribbon having a cyan component, a magenta component, a yellow component, and a black component. A black ribbon, which may be used alone or in conjunction with the three or four color ribbons, is obtainable from Sharp Electronics under Model No. A4JX61RBT.

Printhead element 16 is capable of accepting 256 electrical levels of input for the purpose of specifying how much heat will be applied to each of the heating elements 20. In effect, this allows print head element 16 to specify, for each pixel, 256 levels of intensity for each of the primary colors, giving the system 10 an almost unlimited spectrum of colors that may be printed. The 256 electrical levels of input are communicated to print head element 16 in an eight-bit per pixel binary format. Of course, an eight-bit binary format can express precisely 256 different values.

The relationship between the amount of electrical power which is applied to a heating element 20 and the perceived intensity of the resulting colorant transfer to the substrate 12 is not a linear one, and it has been found that not all of the 256 possible electrical input levels to the heating element 20 will result in an amount of dye deposition which will be visible on the substrate 12. Furthermore, the electrical input levels that do result in a visible colorant deposition do not necessarily result in a linear increase in visible colorant concentration; the relationship is a nonlinear one that depends on a number of different factors and is best determined empirically. More specifically, the inventors have found that, out of the 256 possible electrical levels of input for the heating elements 20 of print head element 16, the lowest 80 levels will not produce a visible image, and the highest 10-15 levels produce complete saturation. To provide the desired relationship between the input value which specifies pixel intensity and the electrical signal to the corresponding heating element, a 256-level gamma table is conventionally used. A gamma table thus converts the pixel intensity values to the electrical levels that are required by the printer.

Printer controller 18 is designed to accept image information input from a unit, such as a personal computer, which specifies the image intensity for each pixel on the substrate 12 in terms of an eight-bit binary value. To ensure that any non-zero manifestation of this value does in fact result in visible colorant deposition, the inventors first experimented with compressing the 256 values into the approximately (255-80) electrical levels which represented the visible colorant deposition range. This, unfortunately, resulted in two of the input values being assigned to several of the different electrical levels, which created artifacts such as a banding effect in images such as sweeps.

To eliminate such problems, the preferred embodiment of the invention utilizes a 16 level (instead of a 256 level) gamma table which is linear in the spectrum of visible electrical input for each primary color and which fully spans the range of electrical inputs from no ink to full saturation. To create the effect of 256 distinct levels of intensity, the invention uses a process called dithering, which spatially interpolates between the 16 distinct gamma table values. One benefit of this process is that the pixel values of each of the primary colors can be represented in the form of four-bit values instead of the eight-bit values required by the normal rendering method.

Figure 2:
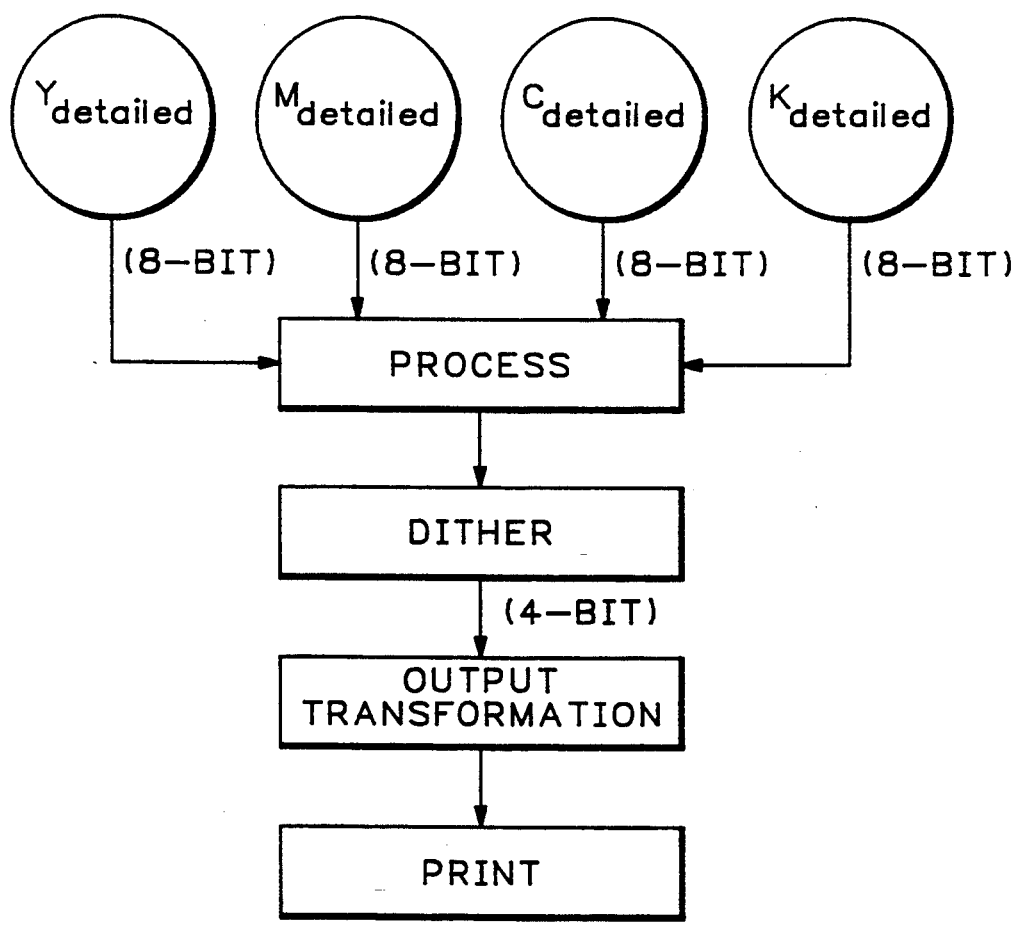
FIG. 2 is a flow chart depicting operation of the system depicted in FIG. 1.

Referring now to FIG. 2, it will be seen that printer controller 18 is constructed and arranged to sequentially process arrays of four eight-bit input values of the rounding-off process $Y_{detailed}$, $M_{detailed}$, $C_{detailed}$, and $K_{detailed}$, which represent, respectively, the specified intensity for each pixel area for the primary colors of yellow (Y), magenta (M), cyan (C), and black (K).

The information represented by the eight-bit values is then processed into less detailed image intensity information, which is then dithered to approximate the intensity resolution of the detailed image intensity information. The dithering step, in effect, injects a degree of pseudo-randomness into how the eight-bit values are "rounded" off into the four bit approximated values, which eliminates patterning and other related created artifacts that might otherwise happen as a result of the rounding-off process. This dithered information, which is preferably in four-bit per pixel format, is then processed through an output transformation step, which adjusts for the non-linearity between electrical level input and print intensity output by assigning, through an output gamma table, predetermined electrical input values to the heating elements 20 for each four-bit dithered signal input. The pixel of information is then printed on substrate 12 at the intended intensity.

The processing step is preferably performed by processing the detailed, eight-bit, image intensity information into a first approximated intensity value and a differential value which represents the difference between the first approximated value and the detailed image intensity information. The dithering step is preferably performed by comparing the differential value with a predetermined value which has been setup for the one pixel area; and determining whether to use the first approximated value or a second approximated value on the basis of such comparison.

Figure 4:
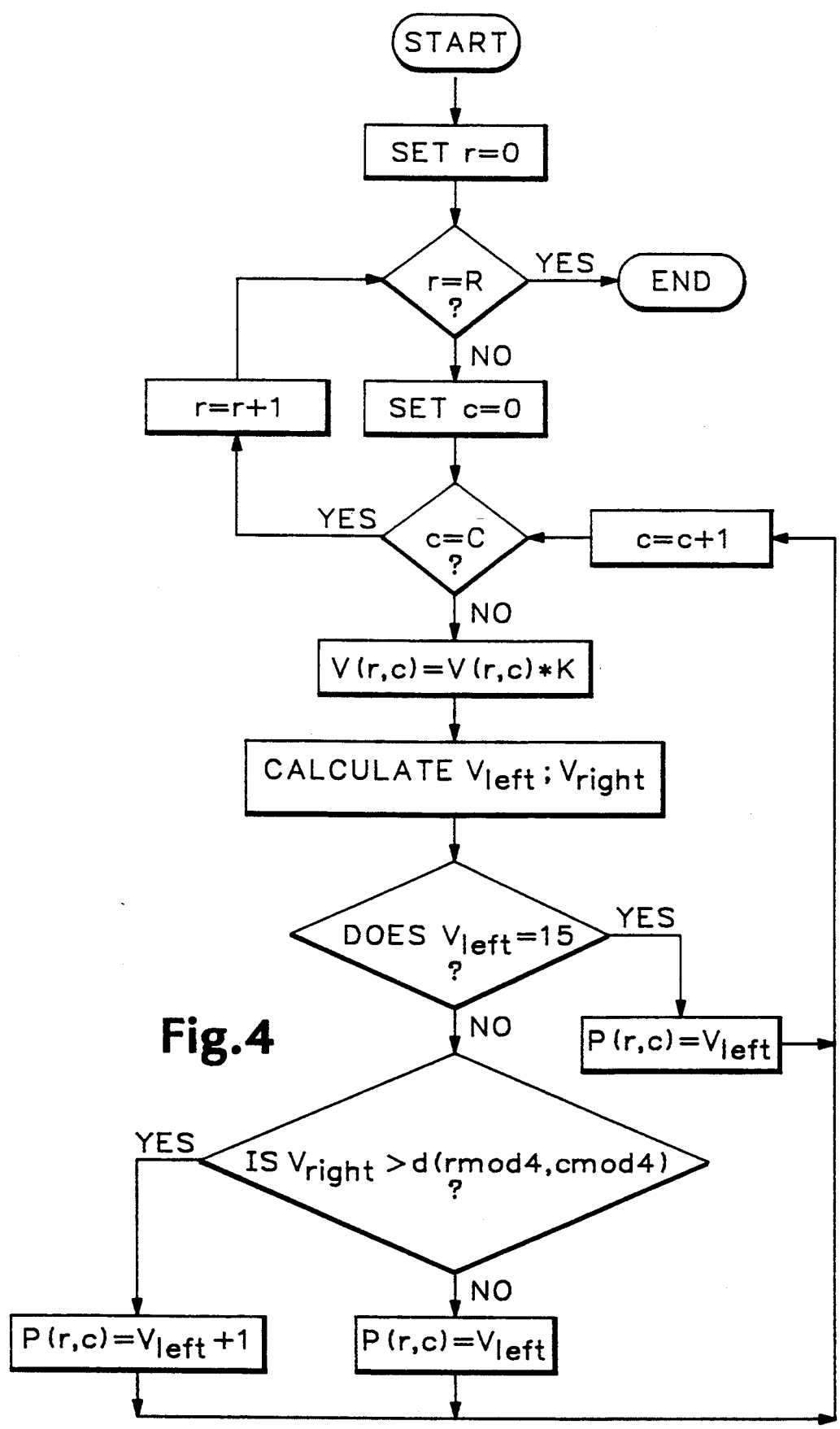
FIG. 4 is a flowchart depicting a portion of the process illustrated in FIG. 2, in a greater level of detail.

Referring to FIG. 4, which represents the process depicted in FIG. 2 in a greater level of detail, the processing of a two dimensional array V will be discussed. Two dimensional array V may represent intensity information for yellow, magenta, cyan or black, and is sized so as to store such intensity information for the pixels in rows 0 through R, and columns 0 through C. The information in array V is in eight-bit format representing any of 256 different intensity levels for the color component which is represented therein.

Figure 3:
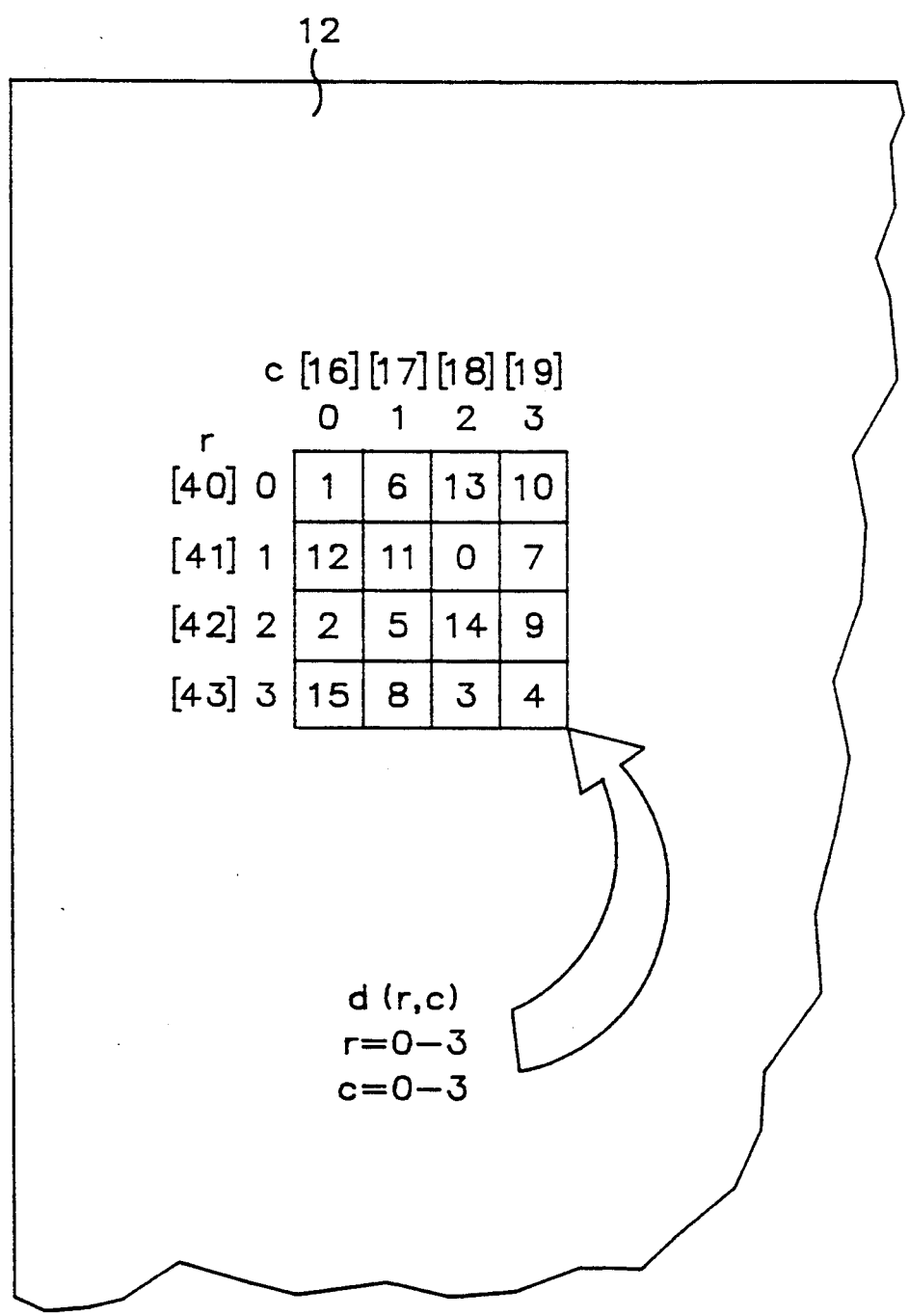
FIG. 3 is a diagrammatical depiction of a dither cell according to the invention superimposed over a substrate upon which an image is to be printed.

Looking briefly to FIG. 3, it will be seen that a dithering cell d is logically replicated from the top left corner of the substrate 12 across the substrate and then down the substrate. This can be done without physically replicating the dithering cell by simply using modulus arithmetic to reference elements of the dithering cell while processing individual pixels on the substrate 12. Assuming that r specifies the current row of the page, that c specifies the current column, and that d(i,j) specifies an element of the dithering cell, then d(r mod 4, c mod 4) corresponds to the pixel at row r and column c of the page. As may be seen in FIG. 4, each value V(r,c) is first multiplied by a constant K to compress the possible range of values for the eight-bit signal into what can be approximated by a four-bit signal. More specifically, each eight-bit value V(r,c) is multiplied by a constant K which is equal to 240 divided by 256. After this step, the resulting eight-bit value can be no greater than the digital representation of 240, which is [11110000].

Preferably, dither cell d is arranged as a magic square, meaning that the sum of the values in diagonals, rows and columns will be the same. This minimizes patterning to the greatest extent possible.

At this point, two four-bit values, $V_{left}$ and $V_{right}$, are calculated. $V_{left}$ is set to equal the four leftmost bits of v(r,c) and $V_{right}$ is set to equal the four rightmost bits of v(r,c). At this point, printer controller 18 inquires as to whether $V_{left}$ is equal to 15, which in binary form is represented as [1111]. If $V_{left}$ does equal 15, then a four-bit value P(r,c) in a two dimensional array P is set to equal $V_{left}$. If $V_{left}$ is not equal to 15, printer controller 18 then inquires whether $V_{right}$ is greater than d(r mod 4, c mod 4). If $V_{right}$ is greater, then four-bit value P(r,c) is set equal to $V_{left}$ plus one. If $V_{right}$ is not greater, then P(r,c) is set equal to $V_{left}$. This completes the dithering step which is represented in FIG. 2.

An example of the processing and dithering sequences may be expressed as follows:

| Example | |
|---|---|
| V(10, 15) = 11010010 ($V_{detailed}$) | (1) |
| K = 240/256 | (2) |
| V(10, 15) = (11010010) * (240/256) = 11000101 | (3) |
| $V_{left}$ = 1100(≠ 1111) | (4) |
| $V_{right}$ = 0101 | (5) |
| d(10 mod 4, 15 mod 4) = d(2, 3) = 9 '2 1001 | (6) |
| 0101 is not > 1001 | (7) |
| P(10, 15) = $V_{left}$ '2 1100 | (8) |

The intensity of P(10,15), then, will be 1100, or 12 in base 10 format.

In the output transformation step, each of the four-bit values P(r,c) are replaced by an eight-bit output of print driver value which has been predetermined to correspond to the particular four-bit value contained in P(r,c).

The following table illustrates the preferred values of print head element output which correspond to the respective 16 electrical input values. As will be seen in the table, the print drive or printhead element output values are expressed in eight-bit format, having possible values of 0–255.

TABLE I

| Input Four-Bit | Output Transformation Mapping Eight-Bit Output | | | |
|---|---|---|---|---|
| | Yellow | Magenta | Cyan | Black |
| A. Plain Paper Colorant Deposition | | | | |
| 0 | 46 | 46 | 43 | 42 |
| 1 | 78 | 78 | 68 | 81 |
| 2 | 87 | 87 | 76 | 93 |
| 3 | 97 | 97 | 87 | 104 |
| 4 | 107 | 107 | 100 | 115 |
| 5 | 116 | 116 | 111 | 124 |
| 6 | 124 | 124 | 123 | 134 |
| 7 | 133 | 133 | 132 | 145 |
| 8 | 142 | 142 | 141 | 157 |
| 9 | 153 | 153 | 152 | 169 |
| 10 | 165 | 165 | 164 | 182 |
| 11 | 179 | 179 | 178 | 194 |
| 12 | 193 | 193 | 192 | 206 |
| 13 | 210 | 210 | 210 | 221 |
| 14 | 230 | 230 | 230 | 236 |
| 15 | 255 | 255 | 255 | 255 |
| A. Colorant Deposition on Overhead Transparency | | | | |
| 0 | 46 | 45 | 48 | 56 |
| 1 | 86 | 86 | 76 | 95 |

TABLE I-continued

| Input | Output Transformation Mapping | | | |
| --- | --- | --- | --- | --- |
| | Eight-Bit Output | | | |
| Four-Bit | Yellow | Magenta | Cyan | Black |
| 2 | 104 | 104 | 94 | 115 |
| 3 | 116 | 116 | 107 | 130 |
| 4 | 127 | 127 | 119 | 142 |
| 5 | 139 | 139 | 133 | 153 |
| 6 | 150 | 150 | 145 | 164 |
| 7 | 159 | 159 | 155 | 176 |
| 8 | 171 | 171 | 168 | 185 |
| 9 | 179 | 179 | 176 | 195 |
| 10 | 190 | 190 | 188 | 205 |
| 11 | 200 | 200 | 199 | 216 |
| 12 | 212 | 212 | 212 | 223 |
| 13 | 225 | 225 | 225 | 233 |
| 14 | 239 | 239 | 239 | 242 |
| 15 | 255 | 255 | 255 | 255 |

This corrects for the non-linearity between the electrical input to the heating elements 20 in printhead 16 and the perceptible intensity of the colorant that is transferred to the substrate 12.

Although the described embodiment is a thermal mass transfer printer, it is to be understood that the invention as described in the appended claims may be any type of intensity-variable printer as defined in the description of the prior art.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of printing a multi-color image on a substrate based on detailed image intensity information for each of discrete pixel areas of the substrate, comprising the steps of:
    (a) processing the detailed image intensity information into less detailed image intensity information;
    (b) dithering the less detailed image intensity information to approximate intensity resolution of the detailed image intensity information for said multi-color image while substantially avoiding patterning; and
    (c) printing said multi-color image according to the dithered less detailed image intensity information on to the substrate.

2. A method according to claim 1, wherein the detailed image intensity information comprises eight-bit values representing 256-level image intensity information for each pixel area on the substrate.

3. A method according to claim 2, wherein the less detailed image intensity information comprises four-bit values representing 16-level image intensity information for each pixel area on the substrate.

4. A method according to claim 2, wherein the eight-bit values having rightmost bits, and step (a) comprises disregarding the four rightmost bits in the eight-bit values.

5. A method according to claim 4, wherein step (a) comprises disregarding four rightmost bits in the eight-bit values.

6. A method according to claim 1, wherein steps (a) and (b) and are repeated for printing at least three primary color components on the substrate.

7. A method according to claim 1, wherein step (b) is accomplished by using a 4-by-4 dither cell.

8. A method according to claim 1, wherein step (b) is accomplished by using a magic-square dither cell.

9. A method according to claim 1, wherein step (c) is performed with a diffusion type printer.

10. A method of printing on a one-pixel area of a substrate based on detailed intensity information for the one-pixel area, comprising the steps of:
    (a) processing tile detailed image intensity information into a first approximated intensity value and a differential value which represents a difference between the first approximated value and the detailed image intensity information;
    (b) comparing the differential value with a predetermined value in a dithering table which has been set for the one-pixel area;
    (c) determining whether to use the first approximated value or a second approximated value on the basis of such comparison for an intensity so as to substantially avoid patterning; and
    (d) printing on tile one-pixel area at the intensity which has been determined in step (c).

11. A method according to claim 10, wherein the detailed image intensity information comprises an eight-bit value representing 256-level image intensity information for the one-pixel area.

12. A method according to claim 11, wherein the first approximated intensity value consists of leftmost four bits of the eight-bit value, and the differential value consists of rightmost four bits of the eight-bit value.

13. A method according to claim 10, wherein steps (a), (b), (c) and (d) are repeated for printing at least three primary color components on the substrate.

14. A method according to claim 10, wherein the predetermined value in step (b) is part of a dither cell.

15. A method according to claim 14, wherein the predetermined value is part of a magic-square dither cell.

16. A method according to claim 10, wherein step (c) comprises selecting the second approximated value if the differential value is greater than the predetermined value, and selecting the first approximated value if the differential value is not greater than the predetermined value.

17. A method according to claim 10, further comprising multiplying the detailed intensity information by a constant prior to step (a).

18. A method according to claim 10, wherein step (d) is performed with a diffusion type printer.

19. A method of printing a multi-color image on a substrate based on detailed image intensity information for each of discrete pixel areas of the substrate, comprising the steps of:
    (a) processing the detailed image intensity information into a first less detailed image intensity value;
    (b) determining whether to use the first less detailed image intensity value or a second image intensity value obtained from a comparison of a difference between the detailed image intensity information and a first value against a predetermined value in a dithering table while substantially avoiding patterning; and (c) printing said multi-color image on the substrate in accordance with the determination made in step (b).

20. A method according to claim 19, wherein the detailed image intensity information comprises eight-bit values representing 256-level image intensity information for each pixel area on the substrate.

21. A method according to claim 20, wherein the less detailed image intensity information comprises four-bit values representing 16-level image intensity information for each pixel area on the substrate.

22. A method according to claim 20, wherein step (a) comprises disregarding at least one of rightmost bits in the eight-bit values.

23. A method according to claim 22, wherein step (a) comprises disregarding four of the rightmost bits in the eight-bit values.

24. A method according to claim 19, wherein steps (a), (b), and (c) are repeated for printing at least three primary color components on the substrate.

25. A method according to claim 19, wherein the second image intensity value is determined with reference to a dithering cell in a dithering table which corresponds to a portion of the substrate.

26. A method according to claim 25, wherein the dither cell is a magic square dither cell.

27. A method according to claim 19, wherein step (c) is performed with a diffusion type printer.

28. A method of printing a multi-color image on a substrate based on detailed image intensity information for each of discrete pixel areas of the substrate, comprising the steps of:
 (a) processing the detailed image intensity information into a first less detailed image intensity value;
 (b) determining based upon a predetermined value in a dithering table whether to use the first less detailed image intensity value or a second image intensity value which has a same level of detail as the first less detailed image intensity value so as to substantially avoid patterning;
 (c) transforming the value determined in step (b) into a multi-color printer acceptable format; and
 (d) printing the transformed information on to the substrate.

29. A method according to claim 28, wherein the detailed image intensity information comprises eight-bit values representing 256-level image intensity information for each pixel area on the substrate.

30. A method according to claim 29, wherein the less detailed image intensity information comprises four-bit values representing 16-level image intensity information for each pixel area on the substrate.

31. A method according to claim 29, wherein step (b) comprises disregarding at least one of rightmost bits in the eight-bit values.

32. A method according to claim 31, wherein step (b) comprises disregarding four rightmost bits in the eight-bit values.

33. A method according to claim 28, wherein steps (a), (b), (c), and (d) are repeated for printing at least three primary color components on the substrate.

34. A method according to claim 28, wherein step (b) further comprises determining whether to use the first less detailed image intensity value or the second image intensity value based on a difference between the detailed intensity information and the first image intensity value.

35. A method according to claim 34, wherein step (b) is further accomplished with reference to a dither cell in a dithering table that corresponds to a portion of the substrate.

36. A method according to claim 35, wherein step (b) is further accomplished by using a magic square dither cell.

37. A method according to claim 28, wherein step (c) comprises transforming the value determined in step (b) into a format which has a specificity of the detailed image intensity information.

38. A method according to claim 37, wherein the detailed image intensity information and the printer acceptable format both comprise eight-bit values representing 256-level image intensity information for each pixel area on the substrate.

39. A method according to claim 28, wherein step (c) corrects for any non-linearity between the value determined in step (b) and a perceptible intensity level of a colorant that is transferred to the substrate.

40. A method according to claim 39, wherein step (c) further comprises considering the non-linearity depending upon the substrate being paper or overhead transparency material prior to making said transformation.

* * * * *